May 6, 1924.
E. RYDER
1,492,897
RADIATOR SHUTTER
Filed Nov. 16, 1921
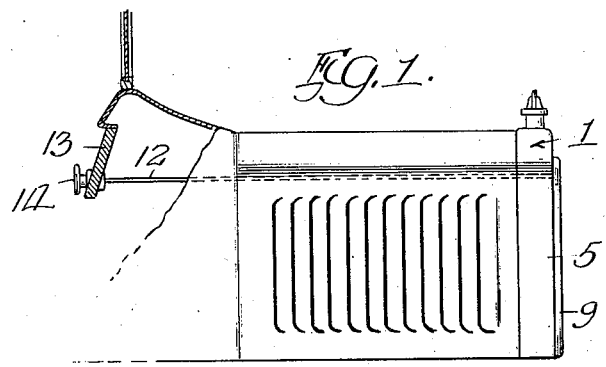
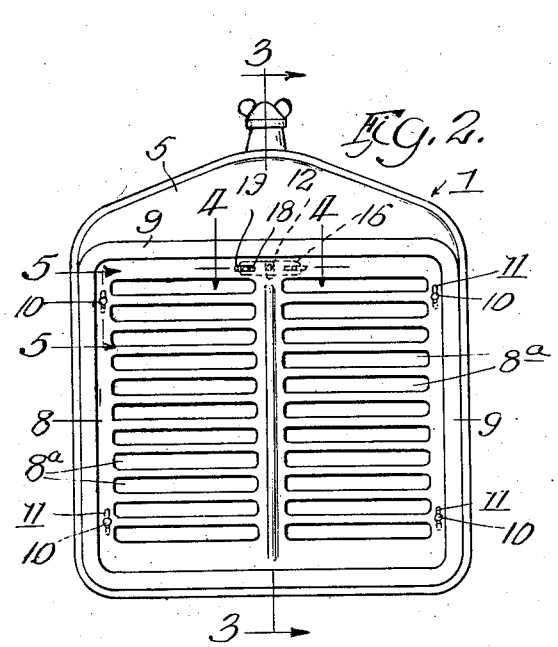
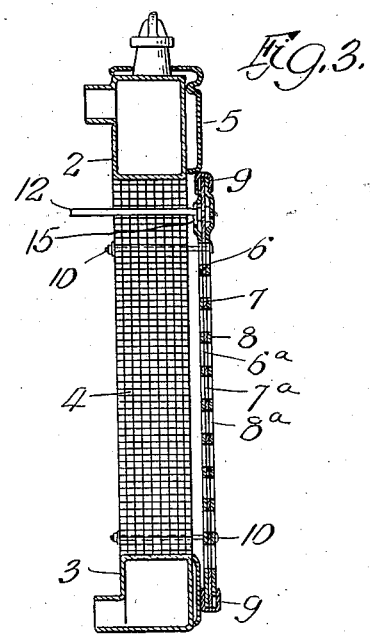
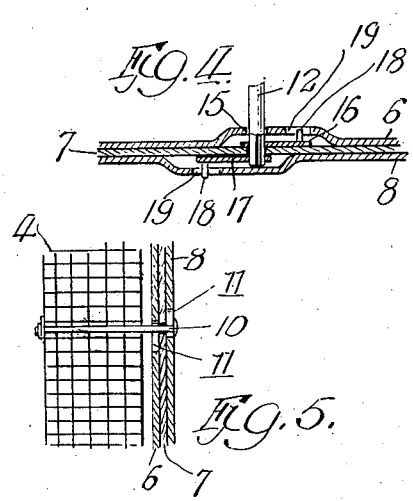
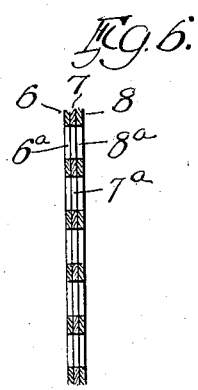
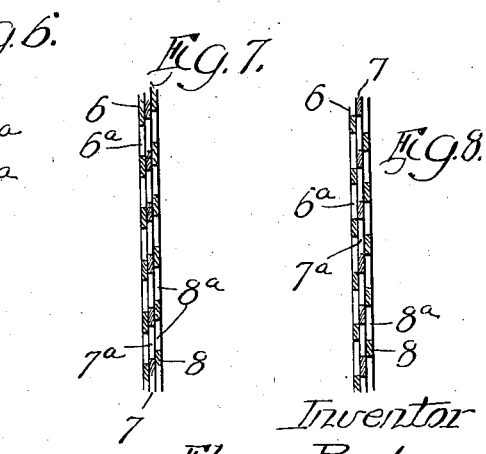
Inventor
Elmer Ryder Patented May 6, 1924.

1,492,897

UNITED STATES PATENT OFFICE.

ELMER RYDER, OF ARGO, ILLINOIS.

RADIATOR SHUTTER.

Application filed November 16, 1921. Serial No. 515,466.

*To all whom it may concern:*

Be it known that I, ELMER RYDER, a citizen of the United States, residing at Argo, in the county of Cook and State of Illinois, have invented new and useful Improvements in Radiator Shutters, of which the following is a specification.

This invention relates to air controlling shutters for the fronts of radiators of automobiles and other motor vehicles.

One object of my invention is to make the shutter mechanism of the sliding plate type, as distinguished from the pivoted vane type, and to so construct and arrange the plates that a greater area of the radiator core will be exposed to the cooling effect of the air when the shutter is fully open than possible with the plate type of shutter as heretofore employed, thus allowing my improved shutter mechanism to be applied to the radiator as a permanent fixture for all the year use and avoid the necessity of removing the shutter from the radiator in the warm weather and replacing it in cold weather as required with plate shutters heretofore made.

Another object of my invention is to provide my improved shutter mechanism with a plurality of plates, one stationary and the other two movable with respect to each other and to the stationary plate so that the openings or slots in the plates may be made wide enough to expose at least two-thirds of the area of the plates or radiator core when the shutter is fully open, and thus insure a more efficient cooling of the core than with the plate shutters as heretofore made.

A further object of my invention is to connect the movable plates together so that they will balance one another when moved and further enable the use of only one actuating part for both plates.

The invention consists further in the matters hereinafter described and more particularly set forth in the appended claims.

In the accompanying drawings—

Fig. 1 is a side view, with parts broken away, of a radiator and hood of an automobile and showing applied in front of the radiator a shutter mechanism constructed in accordance with my invention;

Fig. 2 is a front view of said radiator with shutter attached;

Figs. 3, 4, and 5 are vertical and horizontal sectional views, respectively, taken on lines 3—3, 4—4, and 5—5 of Fig. 2; and Figs. 6, 7, and 8 are vertical sectional views taken through the shutter plates and showing the same in fully open, partially open, and fully closed positions, respectively.

In the drawings, 1 indicates a radiator of an automobile or other motor vehicle. The radiator is of the usual type for handling cooling water, and comprises, generally, upper and lower tanks 2, 3, a core 4 interposed between and opening into said tanks, and an outside casing or shell 5 surrounding said tanks and core and containing the same. The core 4 is indicated in the conventional form, but it is to be understood that it may be of the honeycomb, cellular, fin and tube, or such other type usually made to allow currents of air to pass therethrough for cooling the water passing through the same.

For controlling the passage of air through the core 4, I provide a shutter mechanism constructed as follows. Said mechanism comprises a plurality of vertically arranged shutter plates, there being three of said plates 6, 7, and 8 in the form of shutter shown in the drawings. These plates are all flat and are arranged one against the other, with the plate 7 fixed against vertical as well as lateral movement and located between the other two, 6 and 8. The latter are movable vertically with respect to each other and to the fixed or stationary plate 7, and thus slide up and down on the latter.

The plates 6, 7, and 8 have substantially the same shape and that is made to conform with the shape of the front face of the core 4. The plates have substantially the same width horizontally, and the movable plates 6 and 8 have substantially the same length vertically. The stationary plate 7, however, is slightly longer vertically than the movable plates so that the latter may have movement vertically within the retaining casing or frame 9 extending about the shutter mechanism, as shown in the drawings.

The shutter mechanism is of a size to extend horizontally and vertically over the front face of the core 4 and, in the form of construction shown in the drawings, is secured to the core by fastening bolts 10, 10 inserted through the plates and into and through the core 4 and having clamp nuts applied thereto on the inside of the core, as shown in Figs. 3 and 5. These bolts 10, 10 extend through vertically arranged, elongated slots 11, 11 in the movable plates 6 and 8, so that these plates may be slid up and down without the bolts stopping them. The marginal frame 9 is secured to and carried by the stationary plate 7. Each of the plates 6, 7, and 8 has a plurality of elongated slots or openings 6ª, 7ª, and 8ª, respectively. These in the construction shown extend horizontally across the plates and are arranged in two vertical rows in each plate and all register when the shutter is fully open, as shown in Figs. 2, 3, and 6. To partially close the shutter, the plates 6 and 8 are moved vertically, one up and the other down to bring their openings 6ª and 8ª slightly out of register with the openings 7ª in the stationary plate 7, as shown in Fig. 7.

To fully close the shutter, the plates 6 and 8 are moved in the same direction until the upper edges of the openings 6ª in the plate 6 are aligned with the bottom edges of the openings 8ª in the plate 8, as shown in Fig. 8.

By the use of three plates, one stationary and the other two movable as described, the openings or slots in said plates may be made vertically wider than when only two plates are used as heretofore, because instead of requiring one plate to close these openings in the stationary plate as heretofore, two plates are employed to close these openings, thus allowing the latter to be made twice as wide. This results in allowing practically two-thirds of the area of the core 4 to be exposed to the air currents when the shutter is fully open. Thus the core 4 may function efficiently and properly as such a small portion of its area is covered by the imperforated parts of the plates, when the shutter is fully open, that the effect of the parts on the cooling action of the core is fairly negligible. Manifestly, my improved shutter may be attached to the radiator as a permanent fixture and be left on in cold as well as in warm weather, because when the shutter is fully open enough air is allowed to pass through the core to carry off sufficient radiant heat even in the hottest weather, which is not the case, however, with shutters as heretofore made, because fully one-half of the area of the core is covered by the imperforated parts of the shutter when fully open, thus making it necessary to remove them from the radiator in warm weather.

For moving the plates 6 and 8, I provide a shaft 12. This extends from the dash-board 13 to and through the core 4, as shown in Fig. 1. At the dash-board, the shaft 12 has a part 14 by which it may be conveniently turned. The other end of said shaft extends through and is journaled in the stationary plate 7 and also through the plate 6, the latter having a vertically elongated slot 15 to receive the shaft and permit said plate 6 to move with respect to said shaft.

Fixed to the front end of said shaft 12 are two arms 16, 17, the latter being between the plates 6 and 7 and the former between the plates 7 and 8, as clearly shown in Fig. 4. These arms extend on opposite sides of said shaft 12 and both have a pin and slot connection 18, 19, respectively, with the associated plates 6 and 8. Thus, when the shaft 12 is turned, the plates 6 and 8 are moved up and down, respectively, to either open or close the slots 6ª, 7ª, and 8ª, or to partially open or close them, as is apparent. The connection of both plates with the shaft 12 and moving one plate up and the other down makes the plates balance each other.

While I have shown and described herein in detail a shutter mechanism of my invention, it is of course to be understood that the details of construction and arrangement of parts as illustrated may be variously changed and modified without departing from the spirit and scope of my invention.

I claim as my invention:

1. A shutter mechanism of the character described, comprising three plates arranged one against the other, said plates having a plurality of openings therein, comprising, substantially two-thirds of the total area of the plates, one of said plates being stationary and the other two being movable with respect to each other and to said stationary plate for opening and closing the openings in said plates, and means for moving said movable plates.

2. A shutter mechanism of the character described, comprising three plates arranged one against the other, said plates having a plurality of openings therein, one of said plates being stationary and the other two being movable with respect to each other and to said stationary plate for opening and closing the openings in said plates, each opening in said stationary plate having a width twice the extent of movement of one of said movable plates into and out of fully open and closed positions, and means for moving said movable plates.

3. A shutter mechanism of the character described, comprising three plates, one being stationary and arranged between the other two, the latter being movable with respect to each other and to said stationary plate, said plates having openings therein, comprising, substantially, two-thirds of the total area of the plates and means for moving said movable plates for opening and closing the openings in said plates.

4. A shutter mechanism of the character described, comprising three plates, said plates having openings therein, comprising, substantially, two-thirds of the total area of the plates one of said plates being stationary and arranged between the other two, the latter being movable with respect to said stationary plate and toward and from each other for opening and closing the openings in said plates, and means for moving said movable plates.

5. A shutter mechanism of the character described, comprising three plates, said plates having openings therein, comprising, substantially, two-thirds of the total area of the plates one of said plates being stationary and arranged between the other two, the latter being movable with respect to said stationary plate and toward and from each other for opening and closing the openings in said plates, and means for moving said plates and connected therewith in a manner causing one plate to counter-balance the other upon the movement of said plates.

6. A shutter mechanism of the character described, comprising three plates, said plates having openings therein, comprising, substantially two-thirds of the total area of the plates one of said plates being stationary and arranged between the other two, the latter being movable with respect to said stationary plate and toward and from each other for opening and closing the openings in said plates, a rock shaft extending through said stationary plate and one of said movable plates, and arms arranged on opposite sides of said stationary plate and fixed to said shaft, said arms extending on opposite sides of said shaft and having a pin and slot connection with said movable plates for moving the same.

In testimony that I claim the foregoing as my invention, I affix my signature, this 10th day of November, A. D. 1921.

ELMER RYDER.